United States Patent
Almasi et al.

(10) Patent No.: US 6,260,036 B1
(45) Date of Patent: *Jul. 10, 2001

(54) SCALABLE PARALLEL ALGORITHM FOR SELF-ORGANIZING MAPS WITH APPLICATIONS TO SPARSE DATA MINING PROBLEMS

(76) Inventors: George S. Almasi, 15 The Ter., Katonah, NY (US) 10536; Richard Douglas Lawrence, 18 Shield La., Ridgefield, CT (US) 06877; Holly Edith Rushmeier, 41-03 N. Moger Ave., Mt. Kisco, NY (US) 10549

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,619

(22) Filed: May 7, 1998

(51) Int. Cl.⁷ .................................................. G06F 17/00
(52) U.S. Cl. ................... 707/2; 707/10; 707/6; 707/7
(58) Field of Search ................. 704/10; 707/2, 707/5, 10, 103, 6, 7; 706/50

(56) References Cited

U.S. PATENT DOCUMENTS

| | | | |
|---|---|---|---|
| 5,675,819 | * | 10/1997 | Schuetze ................................ 704/10 |
| 5,706,495 | * | 1/1998 | Chadha et al. ......................... 707/2 |
| 5,778,362 | * | 7/1998 | Deerwester ............................ 707/5 |
| 5,802,525 | * | 9/1998 | Rigoutsos ............................ 707/103 |
| 5,832,182 | * | 11/1998 | Zhang et al. ......................... 706/50 |
| 5,857,179 | * | 1/1999 | Vaithyanathan et al. ............... 707/2 |
| 5,864,855 | * | 1/1999 | Ruocco et al. ....................... 707/10 |
| 5,940,825 | * | 8/1999 | Castelli et al. ........................ 707/6 |
| 5,983,224 | * | 11/1999 | Singh et al. ........................... 707/6 |
| 6,003,029 | * | 12/1999 | Agrawal et al. ...................... 707/7 |
| 6,012,058 | * | 1/2000 | Fayyad et al. ........................ 707/6 |
| 6,078,918 | * | 6/2000 | Allen et al. ........................... 707/6 |

OTHER PUBLICATIONS

Ng et al., "Vector Quantization for Lossless Textual Data Compression", IEEE, 1995, pp. 474.*
Percival, "Compressed Representation of Backscatter Ionogram database using Kahunen–Loeve Techniques", IEEE, 1995, pp. 574–578.*
Ng et al., "Relational Database Compression Using Augmented Vector Quantization", IEEE, 1995, pp. 540–549.*

* cited by examiner

*Primary Examiner*—Wayne Amsbury
*Assistant Examiner*—Thuy Pardo

(57) ABSTRACT

A method and apparatus for retrieving and organizing data using a self-organizing map in a parallel transaction data base system. With this invention, input records of data are represented as n dimensional vectors. Each of these vectors then compressed by eliminating zeros in the components of these vectors. Then, the self-organizing map algorithm is applied to the compressed input records to group the records into a number of clusters, where each cluster comprises a number of records having common input parameters.

8 Claims, 19 Drawing Sheets

```
initialize weight vectors
t = 0
for (epoch=1, ..., N_epochs)
    interpolate new values for α(t) and σ(t)
    for (record=1, ..., N_records)
        t = t+1
        for (k=1, ..., K)
            compute distances d_k using Eq. (1)
        end for
        compute winning node c using Eq. (2)
        for (k=1, ..., K)
            update weight vectors w_k using Eq. (3)
        end for
    end for
end for
```

FIG.1

```
initialize weight vectors
t = 0
for (epoch=1, ..., N_epochs)
    interpolate new values for σ(t)
    initialize numerator and denominator in Eq. (5) to 0
    for (record=1, ..., N_records)
        t = t+1
        for (k=1, ..., K)
            compute distances d̄_k using Eq. (6)
        end for
        compute winning node c using Eq. (7)
        for (k=1, ..., K)
            accumulate numerator and denominator in Eq. (5)
        end for
    end for
    for (k=1, ..., K)
        update weight vectors w_k using Eq. (5)
    end for
end for
```

FIG.2

```
initialize weight vectors identically in all tasks
t = 0
for (epoch=1, ..., N_epochs)
    interpolate new values for α(t) and σ(t)
    for (record=1, ..., N_records)
        t = t+1
        for (k ∈ my_task)
            compute distances d_k using Eq. (1)
        end for
        MPI_Allgather to communicate each task d_k to all other tasks
        each task (redundantly) computes winning node c using Eq. (2)
        for (k ∈ my_task)
            update weight vectors w_k using Eq. (3)
        end for
    end for
end for
```

FIG. 3

```
initialize weight vectors identically in all tasks
t = 0
for (epoch=1, ..., N_epochs)
    interpolate new values and σ(t)
    initialize numerator and denominator in Eq. (5) to 0
    for (record ∈ [records processed by my_task])
        t = t+1
        for (k=1, ..., K)
            compute distances d̄_k using Eq. (6)
        end for
        compute winning node c using Eq. (7)
        for (k=1, ..., K)
            accumulate local sums numerator and denominator in Eq. (5)
        end for
    end for
    MPI_Allreduce to combine local sums for numerator and denominator into
        global sum in all tasks
    for (k=1, ..., K)
        update weight vector w_k using Eq. (5)
    end for
end for
```

FIG.4

LINEAR SPEEDUP
▲ DATA-PARTITIONED SPARSE BSOM
■ DATA-PARTITIONED BSOM
☐ NETWORK-PARTITIONED SOM

LINEAR SPEEDUP
▲ DATA-PARTITIONED SPARSE BSOM
■ DATA-PARTITIONED BSOM
☐ NETWORK-PARTITIONED SOM

FIG.14

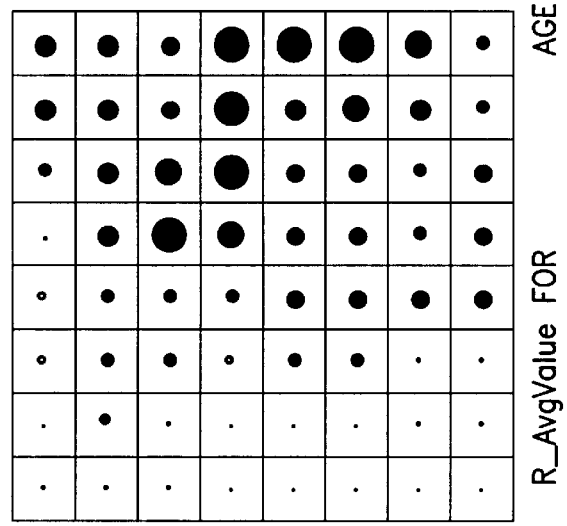
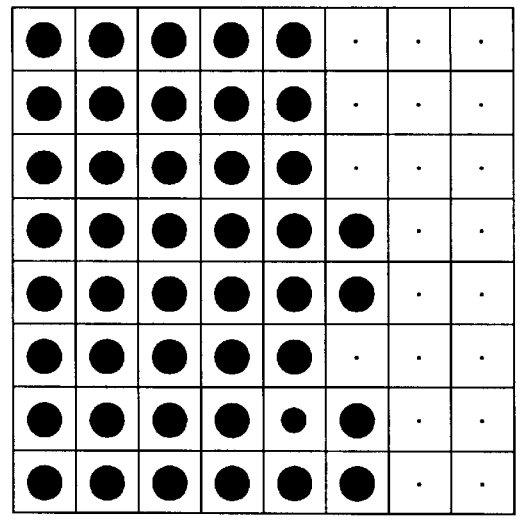
FIG.15

| | | |
|---|---|---|
| final Kmap — grayest = 0.05 of 35957 records; | | |
| File   View   Sort By   Exit | | |
| 1 age 44 av £34<br>£56,422/ 1663<br>● PETROL<br>□ BREAD/MORNING<br>◇ HEALTH/BEAUTY | 2 age 46 av £17<br>£20,446/ 1169<br>● MILK<br>□ INSTOR_BAKRY<br>◇ BREAD/MORNING | 3 age 41 av £45<br>£39,261/ 855<br>○ INSTOR_BAKRY<br>□ CONFECTIONER<br>◇ CSP/SNAX/NUTS |
| 7 age 46 av £30<br>£32,23/ 1090<br>○ INSTOR_BAKRY<br>■ MILK<br>◇ BREAD/MORNING | 8 age 49 av £39<br>£33,649/ 855<br>○ FN_-_SALADS<br>□ FN_-_VEGGIES<br>◇ FN_-_FRUIT_1 | 9 age 47 av £67<br>£57,065/ 858<br>● MILK<br>□ BISCUITS<br>◇ BREAK-CEREALS |
| 13 age 46 av £79<br>£62,804/ 1054<br>● TABLE_WINES<br>□ BEERS/LAGER<br>◇ INSTOR_BAKRY | 14 age 45 av £66<br>£60,420/ 920<br>○ FN-P_PRODUCE<br>□ FN_-_SALADS<br>◇ FN_-_VEGGIES | 15 age 39 av £67<br>£49,444/ 737<br>○ CEREALS/PASTA<br>□ COOK_PRODS<br>◇ CAND/PKT_VEGS |
| 19 age 52 av £301<br>£7,457/ 1219<br>○ SPIRITS<br>■ TABLE_WINES<br>◇ BEERS/LAGER | 20 age 50 av £182<br>£200,177/ 1101<br>○ FRESH_BEER<br>□ PORK/LAMB<br>◆ FRESH_POULTRY | 21 age 38 av £178<br>£180,340/ 1012<br>○ INTERNATIONAL<br>□ CEREALS/PASTA<br>◇ COOK_PRODS |
| 25 age 45 av £346<br>£311,777/ 902<br>● TABLE_WINES<br>□ COOK_SALD_OIL<br>◇ FN-P_PRODUCE | 26 age 39 av £232<br>£210,746/ 908<br>● DELICATESSEN<br>■ PRPK_SALADS<br>◆ PRPK_SAUSAGES | 27 age 39 av £368<br>£343,425/ 932<br>○ INTERNATIONAL<br>□ HAIR CARE<br>◇ CEREALS/PASTA |
| 31 age 43 av £265<br>£261,674/ 987<br>● FRUIT_JCE-FR<br>□ DELICATESSEN<br>◆ FISH | 32 age 44 av £258<br>£241,757/ 936<br>○ FN_-_HORTIC<br>□ NEWS/MAGS<br>◇ FN-P_PRODUCE | 33 age 41 av £379<br>£375,999/ 992<br>● CLOTHING<br>□ LEISURE<br>◇ HEALTH/BEAUTY |

| FIG.18A | FIG.18B |
|---|---|

| mean spent/record=£191. sorted by weights | | |
|---|---|---|
| 4 age 40 av £74<br>£72,921/ 986<br>○ CONFECTIONERY<br>□ CSP/SNAX/NUTS<br>◇ INSTOR_BAKRY | 5 age 56 av £111<br>£100,039/ 901<br>○ BULK_SLC_MEAT<br>□ INSTOR_BAKRY<br>◇ CAKE | 6 age 45 av £239<br>£238,053/ 995<br>○ BULK_SLC_MEAT<br>■ BULK_DELI<br>◇ BULK_CHEESE |
| 10 age 50 av £91<br>£71,035/ 782<br>○ TEA<br>□ MARGARINE<br>◇ BREAD/MORNING | 11 age 51 av £129<br>£107,690/ 834<br>○ HOMEBAKER<br>□ SUGAR<br>◆ EGGS | 12 age 50 av £284<br>£397,220/ 1397<br>○ BULK_BACON<br>□ BULK_CHEESE<br>◇ BULK_SLC_MEAT |
| 16 age 46 av £102<br>£88,239/861<br>○ HSHOLD_POLISH<br>□ HM_LNDRY/SOAP<br>◇ PAPER_PRODS | 17 age 57 av £199<br>£175,922/886<br>● BUTTER/FATS<br>□ SUGAR<br>◇ TEA | 18 age 60 av £280<br>£239,920/ 858<br>● BUTTER/FATS<br>■ PRPK_BACON<br>◇ HOMEBAKER |
| 22 age 42 av £178<br>£169,368/ 950<br>● CANNED_FISH<br>□ CEREALS/PASTA<br>◇ CAND/PKT_VEGS | 23 age 51 av £215<br>£210,973/ 980<br>○ CANNED_FRUIT<br>□ DESSERTS/PUDD<br>◇ BREAK-CEREALS | 24 age 57 av £254<br>£245,337/ 964<br>○ MILK/CREAM<br>□ CANNED_FRUIT<br>◇ DESSERTS/PUDD |
| 28 age 38 av £269<br>£277,364/ 1016<br>○ HAIR_CARE<br>□ HEALTH/BEAUTY<br>◇ FRZ_PROC_MEAT | 29 age 41 av £408<br>£434,314/ 1064<br>● FRZ_POULTRY<br>■ FRZ_MEAT<br>◆ FRZ_SAUSAGE | 30 age 53 av £205<br>£204,769/ 1001<br>○ CANNED_MEAT<br>□ TEA<br>◇ MARGARINE |
| 34 age 32 av £315<br>£365,850/ 1163<br>● BABY_PRODS<br>□ CANND_PASTA<br>◇ DAIRY-FRESH | 35 age 39 av £255<br>£297,300/ 1164<br>○ FRZ_PROC_MEAT<br>□ CSP/SNAX/NUTS<br>◇ PRPK_SLC_MEAT | 36 age 37 av £268<br>£256,411/ 955<br>○ CANNED_MEAT<br>□ CANND_PASTA<br>◇ CAN/PKT_VEGS |

FIG. 18B share of 95,238

| [4] ..weight 0.28<br>01% Val R<br>mean 0.85 0.32<br>mean!0 6.53 0.46<br>partcp 0.13 0.7 | [5] ..weight 0.173<br>01% Val R<br>mean 0.61 0.23<br>mean!0 6.42 0.45<br>partcp 0.1 0.51 | [6] ..weight 0.252<br>02% Val R<br>mean 1.77 0.67<br>mean!0 9.57 0.67<br>partcp 0.18 0.99 |
| --- | --- | --- |
| [7] ..weight 0.13<br>00% Val R<br>mean 0.46 0.17<br>mean!0 6.37 0.45<br>partcp 0.07 0.38 | [8] ..weight 0.232<br>01% Val R<br>mean 0.99 0.37<br>mean!0 8.09 0.57<br>partcp 0.12 0.66 | [9] ..weight 0.196<br>02% Val R<br>mean 1.37 0.52<br>mean!0 7.9 0.56<br>partcp 0.17 0.93 |
| [16] ..weight 0.341<br>02% Val R<br>mean 1.94 0.73<br>mean!0 11.94 0.84<br>partcp 0.16 0.87 | [17] ..weight 0.217<br>01% Val R<br>mean 1.31 0.49<br>mean!0 7.16 0.5<br>partcp 0.18 0.98 | [18] ..weight 0.122<br>01% Val R<br>mean 0.83 0.31<br>mean!0 5.85 0.41<br>partcp 0.14 0.76 |
| [22] ..weight 0.21<br>01% Val R<br>mean 1.29 0.49<br>mean!0 8.78 0.62<br>partcp 0.15 0.79 | [23] ..weight 0.176<br>01% Val R<br>mean 0.82 0.31<br>mean!0 5.58 0.39<br>partcp 0.15 0.79 | [24] ..weight 0.142<br>01% Val R<br>mean 0.83 0.31<br>mean!0 5.62 0.4<br>partcp 0.15 0.8 |
| [28] ..weight 0.229<br>01% Val R<br>mean 1.28 0.49<br>mean!0 4.77 0.34<br>partcp 0.27 1.44 | [29] ..weight 0.374<br>04% Val R<br>mean 3.95 1.49<br>mean!0 12.1 0.85<br>partcp 0.33 1.75 | [30] ..weight 0.113<br>01% Val R<br>mean 0.56 0.21<br>mean!0 4.92 0.35<br>partcp 0.11 0.61 |
| [34] ..weight 0.2.909<br>42% Val R<br>mean 34.16 12.9<br>mean!0 34.22 2.4<br>partcp 1 5.36 | [35] ..weight 0.148<br>01% Val R<br>mean 0.68 0.26<br>mean!0 3.92 0.28<br>partcp 0.17 0.94 | [36] ..weight 0.498<br>03% Val R<br>mean 3.38 1.28<br>mean!0 10.99 0.77<br>partcp 0.37 1.65 |

SCALABLE PARALLEL ALGORITHM FOR SELF-ORGANIZING MAPS WITH APPLICATIONS TO SPARSE DATA MINING PROBLEMS

TECHNICAL FIELD

This invention relates to a method and apparatus for organizing and retrieving data in a parallel transaction data base.

DESCRIPTION OF THE PRIOR ART

Recently, the importance of database mining is growing a rapid pace by the increasing use of computing for various applications. Progress in bar-code technology has made it possible for retail organizations to collect and store massive amounts of sales data. Catalog companies can also collect sales data from the orders they received. A record in such data typically consists of the transaction date, the items bought in that transaction, and possibly the customer-id if such a transaction is made via the use of a credit card or customer card.

The self-organizing map (SOM) [T. Kohonen, The *Self-Organizing Map, Proc. IEEE*, vol. 73, pp. 1551–1558, 1985; T. Kohonen, *Self-Organizing Maps*, Springer, 1995] is a neural network model that is capable of projecting high-dimensional input data onto a low-dimensional (typically two-dimensional) array. This nonlinear projection produces a two-dimensional "feature-map" that can be useful in detecting and analyzing features in the input space. SOM techniques have been successfully applied in a number of disciplines including speech recognition [T. Kohonen, The neural phonetic typewriter, *Computer*, 21 (3), pp. 11–22, 1988], image classification [S. Lu, Pattern classification using self-organizing feature maps, in *IJCNN International Joint Conference on Neural Networks*, Newport Beach, Calif. February 1994], and document clustering [K. Lagus, T. Honkela, S. Kaski, and T. Kohonen, Self-organizing maps of document collections: a new approach to interactive exploration, in *Proc. Second Intl. Conf. On Knowledge Discovery and Data Mining*, Portland, 238–243, August, 1996]. An extensive bibliography of SOM applications is given in T. Kohonen, The *Self-Organizing Map, Proc. IEEE*, vol. 73, pp. 1551–1558, 1985 and is also available at T. Kohonen, J. Hynninen, J. Kangas, and J. Laaksonen, SOM-PAK: The self-organizing map program package, Helsinki University of Technology, http://nucleus.hut.fi/nnrc/som_pak.

Neural networks are most often used to develop models that are capable of predicting or classifying an output as a response to a set of inputs to the trained network. Supervised learning is used to train the network against input data with known outputs. In contrast, the SOM typically is applied to data in which specific classes or outcomes are not known apriori, and hence training is done in unsupervised mode. In this case, the SOM can be used to understand the structure of the input data, and in particular, to identify "clusters" of input records that have similar characteristics in the high-dimensional input space. Now input records (with the same dimensionality as the training vectors) can be analyzed (and assigned to clusters) using the neural weights computed during training. An important characteristic of the SOM is the capability to produce a structured ordering of the input vectors. This "self-organization" is particularly useful in clustering analysis since it provides additional insight into relationship between the identified clusters.

BRIEF DESCRIPTION OF DRAWINGS

FIG. 1 is an outline of the serial on-line SOM algorithm.

FIG. 2 is an outline of serial batch SOM algorithm.

FIG. 3 is an outline of the network-partitioned on-line SOM algorithm.

FIG. 4 is an outline of the data partitioned batch SOM algorithm.

FIG. 14 illustrates the population of the segments found by the SOM method applied to Census data.

FIG. 15 graphically illustrates distribution of gender in the Census data set segmentation.

FIG. 18 illustrates the statistically important inputs for all clusters.

SUMMARY OF THE INVENTION

Figure 5:
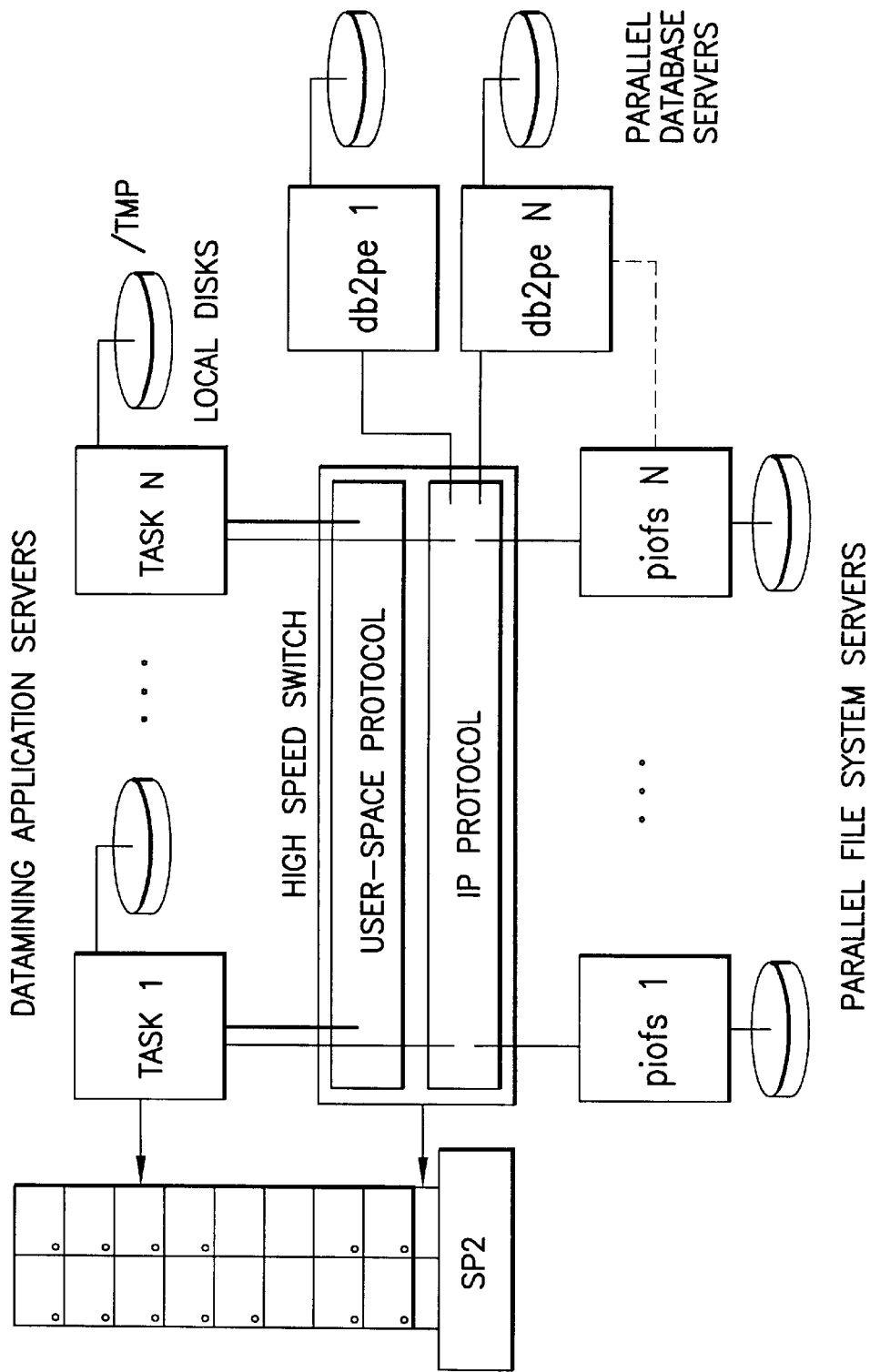
FIG. 5 is an overview of the SP2 as a data mining platform.

It is an object of this invention to improve the response time for data mining for the purpose of identifying clusters of input records which are similar (that is clusters which have common light parameters) by reducing interprocessor communication on a parallel computer.

It is another object of this invention to reduce the computational time in application to data sets with large numbers of records containing zeros in their input fields.

Accordingly, this invention provides a method and apparatus for organizing data in a parallel transaction database which is partitioned across computational processors of a parallel computer. With this invention each record of data is represented as an n dimensional vector. These vectors are then compressed by eliminating zeros in components of these vectors. Finally the compressed input records are then processed by a self-organizing map algorithm SOM to identify groups of records having common input parameters. The invention also deals with determining statistical measures of each cluster.

DESCRIPTION OF THE PREFERRED EMBODIMENT

We describe a scalable parallel implementation of the self-organizing map (SOM) suitable for data-mining applications involving clustering or segmentation against large data sets such as those encountered in the analysis of customer spending patterns. The parallel algorithm is based on the batch SOM formulation in which the neural weights are updated at the end of each pass over the training data. The underlying serial algorithm is enhanced to take advantage of the sparseness often encountered in these data sets. Analysis of a model problem shows that the batch SOM algorithm is at least as robus and converges at least as rapidly as the conventional on-line SOM algorithm.

Performance measurements on an SP2 parallel computer are given for two retail data sets and a publicly available set of census data. These results demonstrate essentially linear speedup for the parallel batch SOM algorithm, using both a memory-contained sparse formulation as well as a separate implementation in which the mining data is accessed directly from a parallel file system. We also present visualizations of the census data to illustrate the value of the clustering information obtained via the parallel SOM method.

Data mining is the process of obtaining previously unknown information from very large databases and using it to make effective business decisions E. Simoudis, Reality check for data mining [*IEEE Expert: Intelligent Systems and their Applications,* 26–33, October 1996]. In the context of data mining segmentation or clustering is used to identify groups of records in a database which are mathematically similar based on known attributes (fields) associated with these records. For example, each record may represent a customer account, with attributes such as historical purchase patterns, demographic data, and other account-specific data which characterize the behaviour of this customer. Such data sets can contain several hundred attributes, and analysis are increasingly inclined to use larger numbers of records in the actual model construction in order to avoid concerns about sampling of the input data set. Parallel processing, coupled with high-speed IO to drive these applications, is an essential component in delivering the application turnaround required by data mining and users.

In this paper, we develop a scalable parallel version of the SOM algorithm suitable for clustering applications that arise in the emerging field of data mining. Data mining is the process of obtaining previously unknown information from very large databases and using it to make effective business decisions [E. Simoudis, Reality check for data mining: *IEEE Expert: Intelligent Systems and their Applications,* 26–33, October 1996]. In the context of data mining, segmentation or clustering is used to identify groups of records in a database which are mathematically similar based on known attributes (fields) associated with these records. For example, each record may represent a customer account, with attributes such as historical purchase patterns, demographic data, and other account-specific data which characterize the behaviour of this customer. Such data sets can contain several hundred attributes, and analysis are increasingly inclined to use larger number of records in the actual model construction in order to avoid concerns about sampling of the input data set. Parallel processing, coupled with high-speed IO to drive these applications, is an essential component in delivering the application turnaround required by data mining end users.

The paper is organized as follows. Section 2 describes the serial implementations of the SOM algorithms, including an enhancement to accommodate the sparse structure often encountered in retail data mining applications. Section 3 describes several different approaches to parallellization of these methods, and Section 4 describes the specific implementations on the target SP2 scalable parallel computer. Section 5 summarizes results for a simple model problem as well as two applications in retail data mining and the analysis of some publicly available census data. Section 6 addresses the issue of interpretation of these results, showing some visualizations of results obtained using these methods.

2 Serial SOM Algorithms

There are several variants [T. Kohonen, Things you haven't heard about the self-organizing map, *Proc. IEEE Int. Joint Conf. Neural Networks,* San Francisco, 1147–1156, 1993] of the SOM, two of which we discuss in this section. As mentioned above, the SOM produces a nonlinear mapping from an n-dimensional input space to a regular two-dimensional lattice of nodes. We assume a set of input vectors $x \in R^n$, and associate a weight or reference vector $w^k \in R^n$, $k=1, \ldots, K$, with each of K neural nodes arranged in a regular two-dimensional (rectangular) lattice. We introduce a discrete time index t such that $x(t)$, $t=0,1, \ldots$, is presented to network at time t, and $w^k(t)$ is the weight vector compound at time t. The available input vectors are recycled during the training or learning process; a single pass over the input data set is an epoch. Initial values for the weight vectors can be assigned randomly or taken equal to K different input records. Different SOM implementations are defined by the method used to update the weight vectors during training.

2.1 On-Line SOM

In the conventional "on-line" or "flowthrough" method, the weight vectors are updated recursively after the presentation of each input vector and each weight vector is computed:

$$d_k(t) = \|x(t) - w_k(t)\|^2. \qquad (1)$$

Next, the winning or best-matching mode (denoted by subscript c) is determined by $$d_c(t) = \min d_k(t). \qquad (2)$$

Note that we suppress the implicit dependence of c on discrete time t. The weight vectors are updated using $$w_k(t+1) = w_k(t) + \alpha(t) h_{ck}(t)[x(t) - w_k(t)], \qquad (3)$$

where $\alpha(t)$ is the learning-rate factor, and $h_{ck}(t)$ is the neighborhood function. The learning-rate factor controls the overall magnitude of the correction to the weight vectors and is reduced monotonically during the training phase. The neighborhood function controls the extent to which $w_k(t)$ is allowed to adjust in response to an input most closely resembling $w_c(t)$, and is typically a decreasing function of the distance on the 2D lattice between nodes c and k. We use the standard Gaussian neighborhood function $$h_{ck}(t) = \exp(-\|r_k - r_c\|^2 / \sigma(t)^2), \qquad (4)$$

where $r_k$ and $r_c$ denote the coordinates of nodes k and c, respectively, on the two-dimensional lattice. The width $o(t)$ of the neighborhood function decreases during training, from an initial value comparable to the dimension of the lattice to a final value effectively equal to the width of a single cell. It is the procedure which produces the self-organization or topology preserving capabilities of the SOM: presentation of each input vector adjusts the weight vector of the winning node along with those of its topological neighbors to more closely resemble the input vector. The converged weight vectors approximate the input probability distribution function, and can be viewed as prototypes representing the input data.

The serial on-line algorithm is summarized in FIG. 1.

2.2 Batch SOM

The SOM updates given by Eq. (3) are "on-line" in the sense that the weight vectors are updated after the presentation of each input record. In the batch SOM algorithm [T. Kohonen, Derivation of a class of training algorithms, *IEEE Trans. Neural Networks* 1, 229–232, 1990; T. Kohonene, Things you haven't heard about the self-organizing map, *Proc. IEEE Int. Joint Conf. Neural Networks*, San Francisco, 1147–1156, 1993; F. Mulier and V. Cherkassky, Self-organization as an iterative kernel smoothing process. *Neural Computation*, 7. 1141–1153, 1995], the weights are updated only at the end of each epoch:

$$w_k(t_f) = \frac{\sum_{t'=t_0}^{t'=t_f} \overline{h}_{ck}(t') x(t')}{\sum_{t'=t_0}^{t'=t_f} \overline{h}_{ck}(t')}, \quad (5)$$

where $t_o$ and $t_f$ denote the start and finish of the present epoch, respectively, and $w_k(t_f)$ are the weight vectors computed at the end of the present epoch. Hence, the summations are accumulated during one complete pass over the input data. The winning node at each presentation is computed using.

$$\overline{d}_k(t) = \|x(t) - w_k(t_0)\|^2, \quad (6)$$

$$d_c(t) = \min/k\; \overline{d}_k(t), \quad (7)$$

where $w_k(t_o)$ are the weight vectors computed at the end of the previous epoch. The neighborhood functions $h_{ck}(t)$ are computed from Eq. (4), but with the winning nodes determined from Eq. (7). This procedure for computing the neighborhood functions is identical to the Voronoi partitioning discussed in [F. Mulier and V. Cherkassky, self-organization as an iterative kernel smoothing process. *Neural Computation*, 7, 1141–1153, 1995]. As in the on-line method, the width of the neighborhood function decreases monotonically over the training phase. FIG. 2 illustrates the batch SOM algorithm.

The batch SOM offers several advantages over the conventional on-line SOM method. Since the weight updates are not recursive, there is no dependence upon the order in which the input records are presented. In addition to facilitating the development of data-partitioned parallel methods, this also eliminates concerns [F. Mulier and V. Cherkassky, Learning Rate Schedules for Self-Organizing maps, *Proc 12th IAPR International Conference on Pattern Recognition*, Jerusalem, Volume II, Conf B, 224–228, 1994] that input records encountered later in the training sequence may overly influence the final results. The learning rate coefficient $\alpha(t)$ does not appear in the batch SOM algorithm, thus eliminating a potential source of poor convergence [M. Ceccarelli, A. Petrosino, and R. Vaccaro, Competitive neural networks on message-passing parallel computers, *Concurrency: Practice and Experience*, 5(6), 449–470, 1993] if this coefficient is not properly specified.

2.3 Sparse batch SOM

As mentioned above, we are applying the SOM methodology to data mining problems involving a potentially large number of attributes such as spending in pre-determined categories. Such data sets often contain a large fraction of zero entries because most records do not contain spending in a large fraction of the categories. Fields containing categorical variables (e.g. occupation) also generate sparse input records after binary expansion of these fields. The weight vectors, in general, will not be sparse since non-zero weight components can occur for any field with at least one non-zero entry in data set.

The batch SOM algorithm can be modified in a straightforward manner so that only operations against non-zero input fields are performed. Eq. (6) is written to the form $$\overline{d}_k(t) = \sum_{x_i \neq 0} x_i(t)[x_i(t) - 2\omega_{ki}(t_0)] + \sum_{i=1}^{n} \omega_{ki}^2(t_0), \quad (8)$$

where the first summation is over the non-zero components of the input vector x(t). The second summation in Eq. (8) is independent of t, and hence is computed and stored at the beginning of each epoch. The numerator of Eq. (5) can also be reduced to a computation involving only the non-zero input fields. Use of this formation reduces the computation from O(K-n) to O(K-n-$f_{nonzero}$) where $f_{nonzero}$ is the fraction nonzero fields in the input data. Note that the computation of the winning cell in Eq. (7) remains the same, but this computation is O(K), not O(K-n)).

The overall sparse batch SOM algorithm is similar to that shown in FIG. 2, with Eq. (6) replaced by Eq. (8), and Eq. (5) replaced by its sparse analog. Analogues ideas [R. Natarajan, Exploratory data analysis in large sparse datasets, IBM Research Report RC 20749, IBM Research, Yorktown Heights, New York, 1997], have also been developed for the conventional on-line SOM algorithm.

3 Parallel SOM algorithms

In general, parallel implementations of neural-network training are developed by either partitioning the network among the processors (network partitioning) or by partitioning the input data across processors (data partitioning). In network partitioning, each processor or parallel task must process every training record using the part of the neural network assigned to it. In data partitioning, each processor trains a full copy of the network using only the input records assigned to it.

3.1 Network partitioning

A number of authors [K. Obermayer, H. Ritter, and K. Shulten Large-scale simulations of self-organizing neural networks on parallel computers: applications to biological modeling, *Parallel Computing*, 14:381–404, 1990; C. H. Wu, R. E. Hodges, and C. J. Wang, Parallelizing the self-organizing feature map on multiprocessor systems, *Parallel Computing*, 17(6–7) 821:832, September, 1991; M. Ceccarelli, A. Petrosino, and R. Vaccaro, Competitive neural networks on message-passing parallel computers, *Concurrency: Practice and Experience*, 5(6), 449–470, 1993; C. V. Buhusi, Parallel implementation of self-organizing neural networks., V. Felea and G. Ciobanu, editors, *Proceedings of 9th Romanian Symposium on Computer Science '93*, 51–58, November, 1993] have implemented network-partitioned parallel methods for the SOM algorithm. The major advantage of this approach is that it preserves the recursive weight update show in Eq. (3), and hence produces exact agreement (within round-off error) with the serial algorithm. FIG. 3 shows the network-partitioned implementation of the basic on-line algorithm from FIG. 1. This algorithm is written in the usual Single Program Multiple Data (SPMD) programming model [W. Gropp, E. Lusk, and A. Skjellum, *Using MPI: Portable Parallel Programming with the Message-Passing Interface*, MIT Press 1994], with each task of the parallel application executing the algorithm shown in FIG. 3. We use calls from the industry-standard Message Passing Interface (MPI) [W. Gropp, E. Lusk, and A. Skjellum, *Using*

MPI: Portable Parallel Programming with the Message-Passing Interface, MIT Press, 1994], to indicate interprocessor communication. Note that the loops over nodes are partitioned across parallel (MPI) tasks, and that communication (using the MPI_Allgather collective communication routine [W. Gropp, E. Lusk, and A. Skjellum, *Using MPI: Portable Parallel Programming with the Message-Passing Interface*, MIT Press, 1994], is required at every iteration in order to determine the winning node. Once all tasks know the winning node, each can update the weight vectors associated with neural nodes in its partition. This communication limits parallel scalability because it introduces a latency-dominated constant overhead at the processing of each input record. Results shown in Section 5.4 confirm the limited scalability of this method, even when applied to problems with relatively large numbers of input fields and neural nodes.

3.2 Data partitioning

Data partitioned algorithms [R. Mann and S. Haykin, A parallel implementation of Kohonen feature maps on the Warp systolic computer, *Proc. Int. Joint Conf. Neural Networks*, Vol. II, 84–87, Washington D.C., January, 1990, M. Ceccarelli, A. Petrosino, and R. Vaccaro, Competitive neural networks on message-passing parallel computers, *Concurrency: Practice and Experience*, 5(6), 449–470, 1993, G. Myklebust and J. G. Solheim, Parallel self-organizing maps for applications, *Proceedings of the IEEE International Conference on Nerual Networks*, Perth, Australia, December, 1995, and P. Ienne, P. Thiran, and N. Vassilas, Modified self-organizing feature map algorithm for efficient digital hardware implementation, *IEEE Transactions on Neural Networks*, Vol. 8, No. 2, 315–330, 1997] offer the potential for much greater scalability since the parallel granularity is determined by the volume of data, which is potentially very large. However, application to the on-line SOM algorithm requires that we relax the strict requirement that the weights be updated at every iteration as in Eq. (3). For example, if the weights are updated only at the end of each epoch, the delayed-update form of the on-line algorithm takes the form [P. Ienne, P. Thiran, and N. Vassilas, Modified self-organizing feature map algorithms for efficient digital hardware implementation, *IEEE Transactions on Neural Networks*, Vol. 8, No. 2, 315–330, 1997]

$$w_k(t_f) = w_k(t_0) + \alpha(t_0) \sum_{t'=t_0}^{t'=t_f} \tilde{h}_{ck}(t')[x(t') - w_k(t_0)], \quad (9)$$

where, as before, $t_o$ and $t_f$ denote the start and finish of the present epoch, and $h_{ck}(t)$ is defined as in Eq. (5). Two potential disadvantages of this approach are (1) the parallel version now differs from the serial result (and, in general, is dependent on the interval between weight updates), and (2) the stability of the method (like its serial counterpart) depends on the choice of $\alpha(t)$ (see: P. Ienne, P. Thiran, and N. Vassilas, Modified self-organizing feature map algorithms for efficient digital hardware implementation, *IEEE Transactions on Neural Networks*, Vol. 8, No. 2, 315–330, 1997, and R. Mann and S. Haykin, A. parallel implementation of Kohonene feature maps on the Warp systolic computer, *Proc. Int. Joint Conf. Neural Networks, Vol. II*, 84–87, Washington, D.C., January, 1990].

The batch SOM method, on the other hand, does not suffer from either of these drawbacks: the serial implementation updates the weights only at the end of each epoch and the learning-rate coefficient $\alpha(t)$ does not appear. In order to facilitate comparison with Eq. (9), we rewrite Eq. (5) in a similar form:

$$w_k(t_f) = w_k(t_0) + \frac{\sum_{t'=t_0}^{t'=t_f} \tilde{h}_{ck}(t')[x(t') - w_k(t_0)]}{\sum_{t'=t_0}^{t'=t_f} \tilde{h}_{ck}(t')}. \quad (10)$$

Comparison of Eqs. (9) and (10) demonstrates that the batch SOM update rule can be obtained from existing network-partitioned algorithms by a specific choice of the learning-rate coefficient:

$$\alpha(t_0) = \frac{1}{\sum_{t'=t_0}^{t'=t_f} \tilde{h}_{ck}(t')}. \quad (11)$$

Hence, we have shown that the batch SOM method provides an alternative means of specifying the learning-rate coefficient in previous data-partitioned learning rules. Note that if the neighborhood functions $h_{ck}$ is specified as a Kronecker delta function, i.e.

$$\tilde{h}_{ck}(t) = \begin{cases} 1 & c \equiv k \\ 0 & \text{otherwise,} \end{cases}$$

Then the net effect Eq. (11) is to average the delayed update to $w_k$ over the number of times node k won during the most recent epoch.

Our data-partitioned parallel method is based on the batch SOM update method given by Eq. (5). The parallel implementation is shown in FIG. 4, where the sparse analogs as discussed in Section 2.3 are used. Note that the input records have been evenly distributed across parallel tasks. Each MPI task processes only the input records assigned to it, and accumulates its contributions to the numerator and denominator in (5). After each task has completed its local accumulation, MPI collective communication (MPI_Allreduce) is used to combine the local sums and place the results in all tasks, each task then performs and identical computation of the new weights using Eq. (5). Note that this algorithm has much coarser granularity than the network-positioned algorithm in FIG. 3 since interprocessor communication occurs only after [$N_{records}/N_{tasks}$] records instead of after every record. Unlike previous data-partitioned parallel implementations, this approach does not involve specification of either a learning-rate coefficient or the frequency with which the weights are updated.

4. Implementation on the SP2 Scalable Parallel Computer

In this section is reviewed the essential architectural features of the target parallel machine, followed by a description of the specific implementations of the algorithms described in the preceding section.

4.1 Overview of the SP2

The IBM RS/6000 SP System is a scalable distributed-memory multiprocessor consisting of up to 512 processing nodes connected by a high-speed switch. Each processing node is a specially packaged RS/6000 workstation CPU with local memory, local disk(s) and an interface to the high performance switch. The SP2 Parallel Environment supports the Message Passing Interface (MPI) [W. Gropp, E. Lusk, and A. Skjellum, *Using MPI: Portable Parallel Programming with the Message-Passing Interface*, MIT Press, 1994.]

for the development of message passing applications. The SP2 Parallel IO File System (PIOFS) permits user-specified striping of data across multiple PIOFS server nodes. A parallel relational database system (DB2 Parallel Edition of DB2PE) is also available on the SP2.

The results in this paper were obtained on a 16-processor SP2 system with 66 MHz "thin" processing nodes, each having a 64 KB data cache, 128 MB memory, and 2 GB local disk. Each CPU can perform 4 floating-point operations per cycle, giving a peak performance rating of 264 MFLOP/s per processing node. Measured at the MPI (application level, the high-speed switch on this specific machine provides up to 48 MB/s of point-to-point bandwidth, with a message-passing latency of about 40 microseconds. Both the processor speed and the sustained interprocessor communication bandwidth are faster for more recent SP2 systems [*IBM RS/6000 SP System*, http://http://www.rs6000.ibm.com/hardware/largescale], and we would expect the performance reported here to increase accordingly.

FIG. 5 shows a high-level view of the SP2 as a data mining platform. Application server nodes communicate with each other using MP1 via "user-space" communication across the switch. These same application servers also communicate over the switch with parallel file servers and parallel database servers using a high-speed IP protocol that is slower than the user-space protocol but still much faster than IP across a typical local area network.

Parallel IO can be obtained from an input data file that has been partitioned onto the processors' local disks, or from the Parallel IO File System, or from DB2 Parallel Edition. (A parallel extract from DB2PE to PIOFS for performance reasons is also possible.) The first approach is simplest but least flexible. There must be exactly as many parallel tasks as there are partitions, and the mapping of tasks onto processors is preordained by the partitioning: if part 1 of the data file is on the local disk of processor 1, then task 1 must always run on processor 1.

With the PIOFS parallel file system, the input is truly a single file rather than a multiplicity. PIOFS supports user specified striping of data across multiple PIOFS server nodes, accessed by PIOFS clients that are called by the MPI tasks. The clients can be open different views of the striped data so that, for example, it is easy to switch for reading records in round robin fashion to reading them in large contiguous chunks without having a rewrite the data. A single client can access multiple servers, a single server can serve multiple clients, or multiple clients can access multiple servers. The number of servers and clients can be equal or not, and they can be co-resident on the same processor or mot. A 16-task parallel program-PIOFS can be used as a regular unix file system.

DB2PE was not used in the applications discussed in this paper.

4.2 Specific Implementations

The 16-node SP2 has PIOFS clients and servers installed on all nodes. In all applications, the input training data was striped in equal-size blocks across all 16 PIOFS servers, and the same physical nodes were also used to execute the parallel applications. Our data mining runs use $N_{tasks}$=1, 2, 4, 8, or 16 parallel application tasks. Each application task opens the training-data file such that all tasks can simultaneously read blocks of data from different PIOFS servers. For example, for $N_{tasks}$=2, the first application task will read data from the first 8 PIOFS servers, while the second parallel task will read data from last 8 PIPFS servers.

We report results for three different parallel implementations:

Network-partitioned SOM: This is the basic parallel on-line SOM algorithm shown in FIG. 3. The complete training data file is read from PIOFS during every epoch. Each task reads a distinct block of data, and hence the read operation proceeds in parallel. However, the network-partitioned algorithm requires that each task "see" every input record, so a collective communication operation (MP_Allgather) is performed so that each task has a copy of the data blocks read by all of the tasks. These records are then processed as shown in FIG. 3.

Data-partitioned BSOM: This is the data-partitioned batch SOM algorithm shown in FIG. 4. In this implementation, each task reads its training data from PIOFS during every epoch, and processes them as shown in FIG. 4 using standard non-sparse batch SOM formulation.

Data-partitioned sparse BSOM: This is the data-partitioned batch SOM algorithm shown in FIG. 4, using the sparse formulation described in Section 2.3. In this implementation, each task reads its training data at the first epoch, compresses out the zero entries, and then stores the compressed data in memory. The compressed data for an input vector consists of the non-zero entries, plus pointers to their original locations in the input vector. All subsequent accesses to training data are directly to this compressed data structure in memory.

5 Numerical Results

All simulations reported in this section used standard exponentially decreasing functions for the learning-rate coefficient α and a width (σ) of the neighborhood function:

$$\alpha(n_c) = \alpha_0 \left(\frac{\alpha_f}{\alpha_0}\right)^{\left(\frac{n_c}{N_c}\right)}$$

$$\sigma(n_c) = \sigma_0 \left(\frac{\alpha_f}{\alpha_0}\right)^{\left(\frac{n_c}{N_c}\right)},$$

Where $n_e$ is the current epoch, and $N_e$ is the total number of epochs, and $\alpha_0$=0.1
$\alpha_1$=0.005
$\sigma_0$=$\sqrt{K}$
$\sigma_1$=0.2.

Note that $\alpha(n_e)$ and $\sigma(n_e)$ are held constant over epoch $(n_e)$.

Unless otherwise stated, all simulations used 25 epochs.

5.1 Model Problem Analysis

We begin with analysis of a simple synthetic problem in order to compare results obtained with the on-line SOM and the batch SOM formulations. Consider a unit square containing a uniformly-spaced 16×16 grid of 256 input vectors x=($x_1$, $x_2$) with $x_1$=$\frac{1}{32}$, $\frac{3}{32}$, ..., $\frac{32}{32}$, for x=1,2. (See FIG. 6). We use this data to train a 4×4 two-dimensional SOM. In the absence of boundary effects, we expect the weights vectors $\overline{\omega}_k$=($\overline{\omega}b_1$, $\overline{\omega}_2$) to converge to the geometric centers of a 4×4 "super-mesh" imposed on top of the 16×16 input mesh, i.e., $\overline{\omega}_i$=$\frac{1}{8}$, $\frac{3}{8}$, $\frac{5}{8}$, $\frac{7}{8}$ for i=1,2. We compute the average quantization error as the average Eclidian distance between each input record and its closest weight vector:

$$E = \frac{1}{256} \sum_{t=1}^{t=256} \|x(t) - w_c(t)\|^2.$$

For the problem just described, it can be shown that the converged weight vectors should produce an average quantization error $E_{ref}$=5/512.

Figure 6:
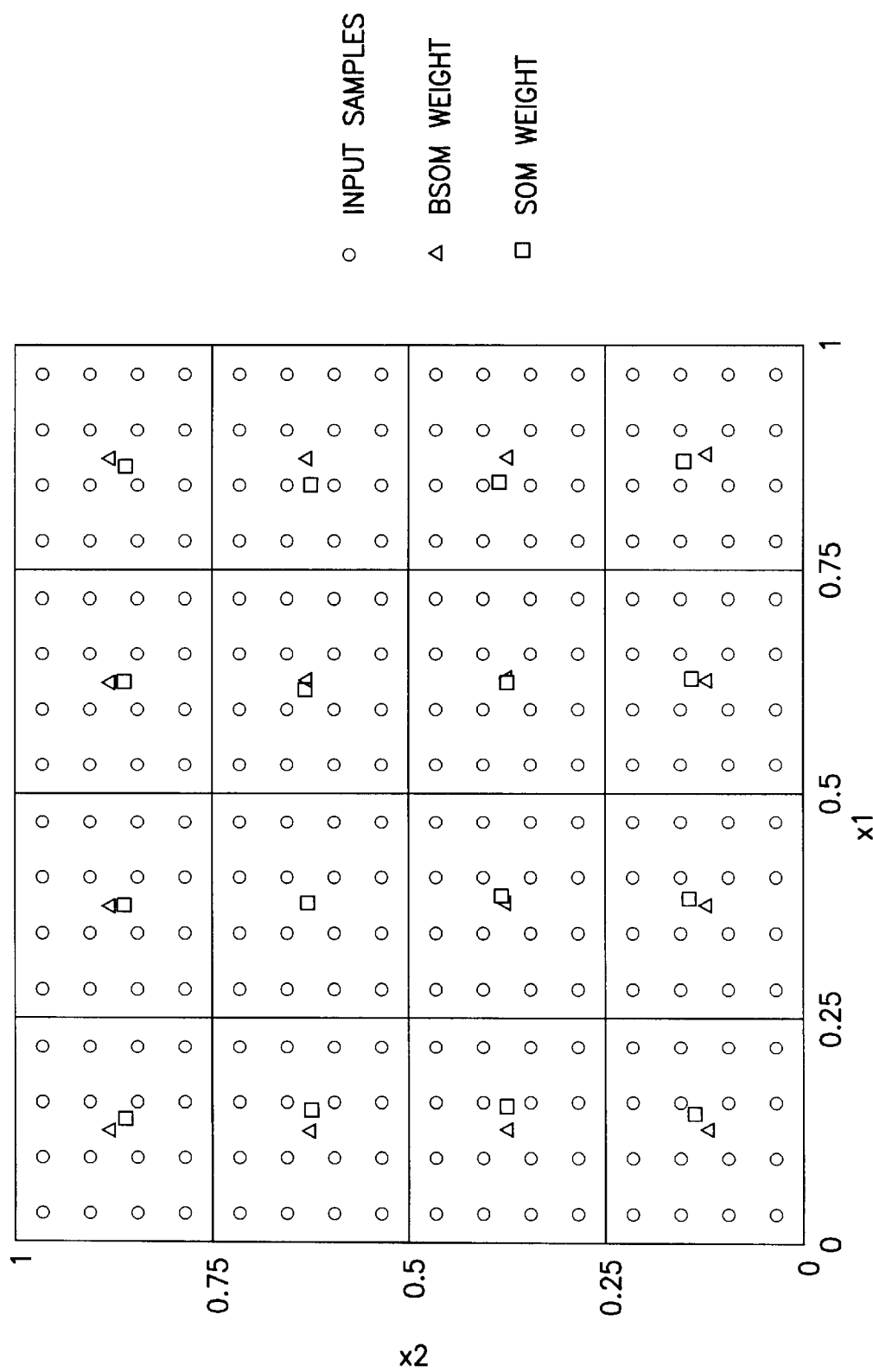
FIG. 6 graphically illustrates weight vectors for a model problem.
Figure 7:
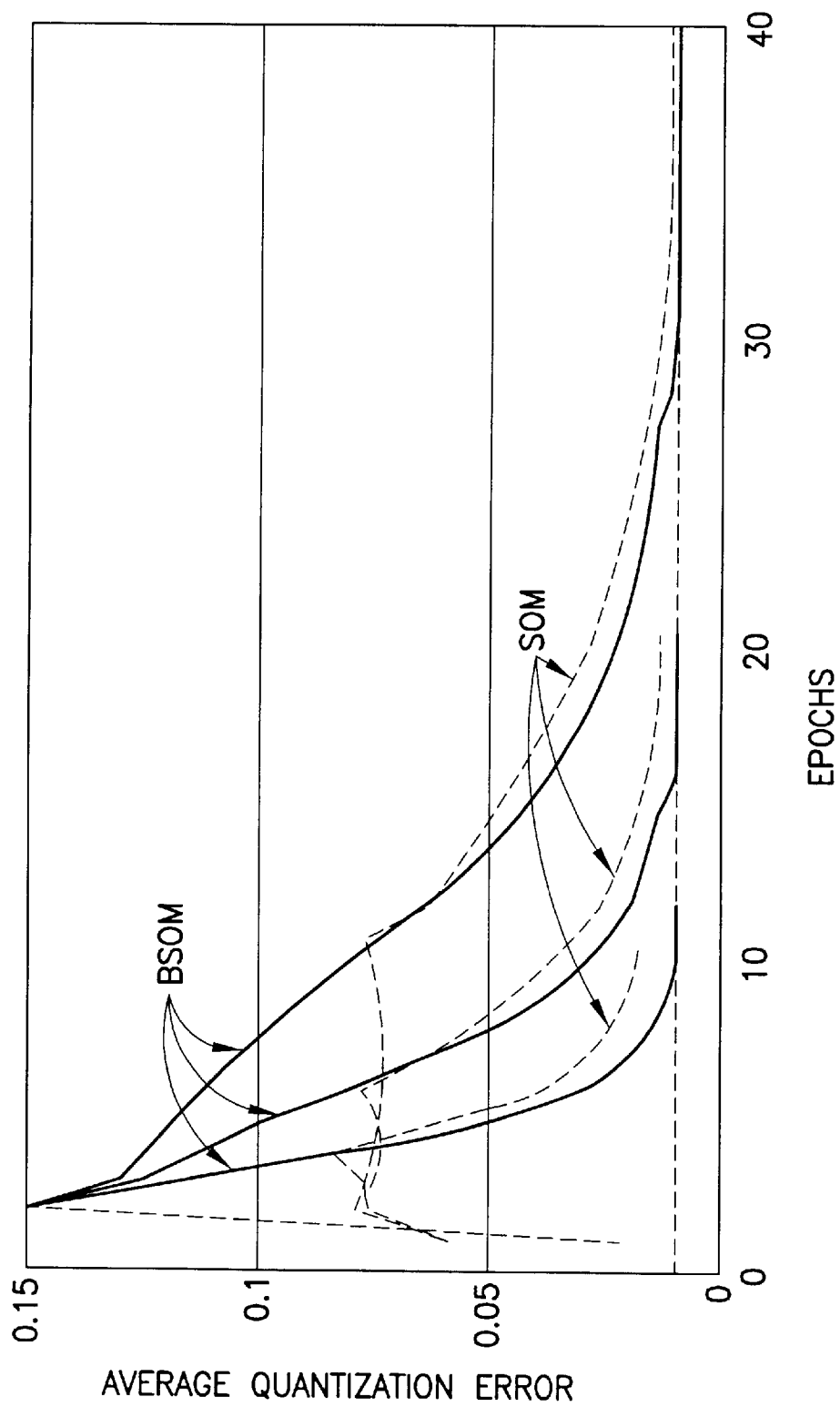
FIG. 7 graphically illustrates the convergence behavior for SOM vs BSOM convergence.

FIG. 7 shows the average quantization error at each epoch for runs with 10, 20, and 40 epochs using the conventional on-line SOM and the batch SOM (BSO-NI). Note that in each case, the BSOM converges noticeably faster to $E_{ref}$ than the on-line SOM. The weight vectors after 40 epochs are shown in FIG. 6; the BSOM vectors show better convergence to the expected positions at the cluster centroids.

5.2 Description of the Application Problems

We consider three realistic applications of the parallel SOM methods. The first, two data sets denoted Retail1 and Retail2, are proprietary spending data: the columns in each record represent (continuous) spending in that attribute. The third data set, Census, is publicly available data from the "adult" database from the Machine Learning Repository at the University of California, Irvine [University of California at Irvine Machine learning databases, ftp://ftp.ics.uci.edu/pub/machine-learning-databases/]. This problem consists of 6 continuous and nominal (or categorical) attributes for a total of 14 input fields. (As discussed at [University of California at Irvine, Machine learning databases, ftp://ftp.ics.uci.edu/pub/machine-learning-databases/], this is actually a classification problem, with one additional output or classification field; we have excluded the classification field, along the field "fnlwgt" from our SOM analysis, leaving 13 active fields.)

the nominal fields in the census data (e.g. education) were expanded using binary mapping: given C possible values (e.g. masters, doctorate, . . . ), this field is expanded to C new columns, all with an entry of 0 except for a 1 in the column corresponding to the matching field value. Table 1 summarizes the characteristics of the 3 data sets. Note that the census data expands from the 13 original attributes to 103 fields after the binary mapping. Retail1 contains 99984 records and 272 fields, but only [0.0287·99984·272] of the input fields have nonzero spending. The fraction of nonzero entries for the census data set is based on the data set after binary expansion.

5.3 Serial Performance

Table 2 summarizes performance of the algorithms described in Section 4.2, executed serially on a single SP2 processor. Performance is given in terms of millions of weight connection updates per second (MCUP/s); for all algorithms (including the sparse BSOM implementation), this is computed as $$\text{effective MCUP}/s = \frac{N_{records} \cdot N_{fields} \cdot N_{nodes} \cdot N_{epochs}}{\text{training time}},$$

where $N_{fields}$ is the number of fields after binary expansion, and $N_{nodes}=K$ is the number of neural nodes. We do not impose any cutoff on the Gaussian neighborhood function [Eq. (4)]; for the on-line SOM algorithm, this means that we update all weights at every record, while for batch SOM, we accumulate contributions in Eq. (5) for all weights. The effective MCUP/s for the sparse batch SOM are determined using the same expression for the number of weight updates to facilitate comparison of absolute computing time with the other algorithms.

The results in Table 2 show that the batch SOM is slightly faster than the on-line SOM since it does fewer floating point operations per update. The sparse batch SOM is particularly effective for Retail1, since this data set is the most sparse. For 16 neural nodes, the sparse BSOM is nearly 14 times faster than the conventional BSOM, but for 64 nodes, the performance improvement drops to a factor of 8.6. The difference in the performance of the sparse BSOM for 16 and 64 nodes in Retail1 appears to be due to the fact that the smaller problem (16 nodes) can be held in the high-speed cache of the SP2 processor during a single iteration, thus minimizing the number of cache misses. It is interesting to note that the 49.35 effective MCUP/s for the 64-node Retail1 problem is equivalent to [0.0287·49.35]=1.41 actual MCUP/s, which is approximately 4 times slower than the non-sparse BSOM for the same problem. The increased time per actual weight update in the sparse BSOM is due to the loss of pipelining efficiency in the SP2 (RS/6000) processor when executing loops with the indirect addressing required in the sparse case. For Retail2, the cost is less, but we see that the sparse BSOM is only slightly more efficient than the conventional BSOM even though the data has a nonzero fraction of 0.4231.

5.4 Parallel Performance

We report parallel performance for the 3 algorithms in terms of speedup as a function of the number of application tasks relative to their respective serial performance given in Table 2. Hence, the absolute performance (MCUP/s) of the parallel versions is given by the product of the parallel speedup and the absolute serial performance from Table 2.

Figure 8:
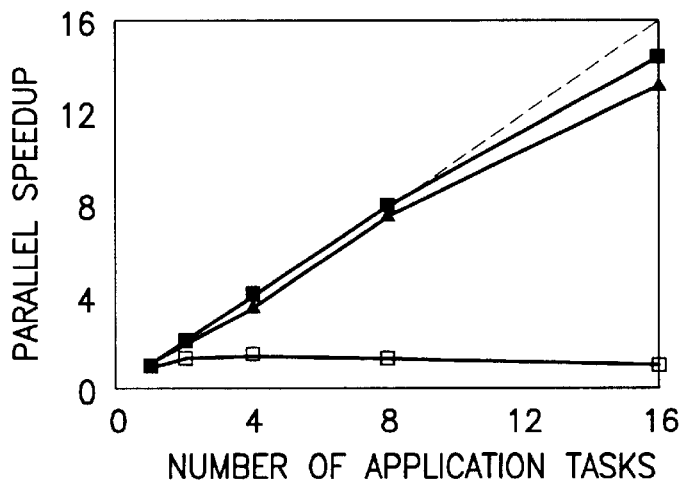
FIG. 8 graphically illustrates the parallel speedups for Retail with 16 neural nodes.
Figure 9:
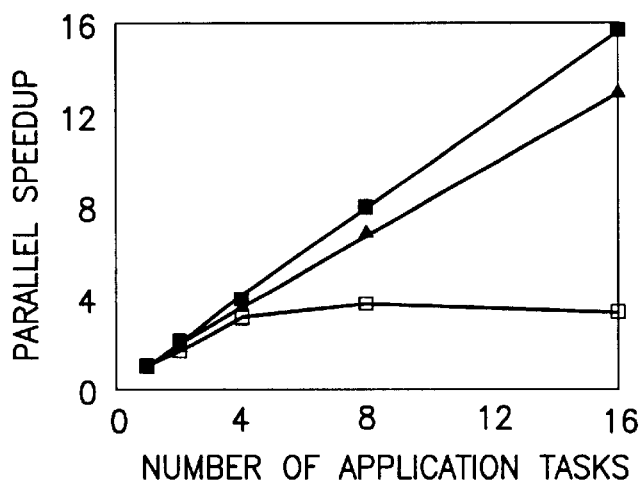
FIG. 9 illustrates the parallel speedups for Retail with 64 neural nodes.

FIGS. 8 and 9 show speedups for the 16- and 64-node Retail1 problems using the 3 different parallel implementations. The network-partitioned SOM method shows essentially no speedup for the smaller 16-node problem, and achieves only a speedup of slightly less than 4 to 8 tasks before tailing off at 16 tasks. As discussed in Section 3.1, this behavior is easily explained by the interprocessor communication overhead incurred at the processing of each record; the performance is somewhat better for 64 nodes because the fixed overhead is a smaller fraction of compute time in each task.

The data-partitioned BSOM methods show excellent scalability for Retail1. It is interesting to note that the non-sparse BSOM method achieves better speedup than the sparse BSOM. This is because the data partitioning was done by allocating equal numbers of records to each application task, and for the sparse BSOM method, this can lead to load imbalance because the data processed by different tasks may have different sparsity ratios. This load imbalance does not occur in the non-sparse SOM because the computation is done for all input fields regardless of whether or not they are zero. For this problem with 16 application tasks, the load imbalance limits the maximum parallel speedup to 14.0, we measures a speedup of 13.2 for the 64-node sparse BSOM run. Note that essentially linear speedup is observed in the data-partitioned BSOM run for 64 nodes. As described in Section 4.2, this method is reading the input data from the parallel file system at every epoch; the excellent scalability at the application level confirms that reading the input data is not limiting scalability of the training run.

Figure 10:
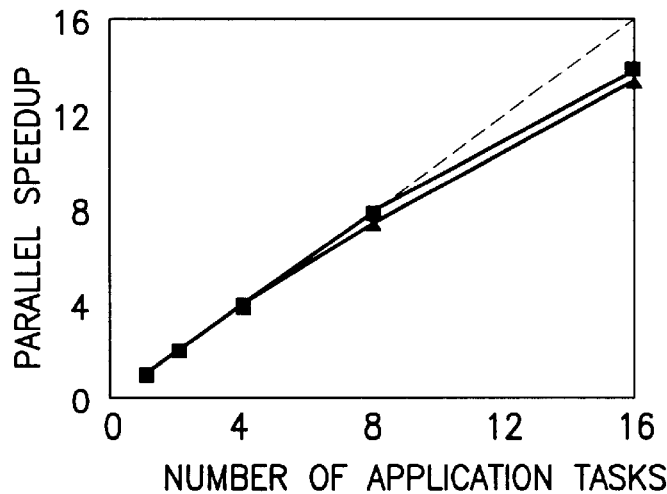
FIG. 10 graphically illustrates the parallel speedups for Retail2 with 16 neural nodes.
Figure 11:
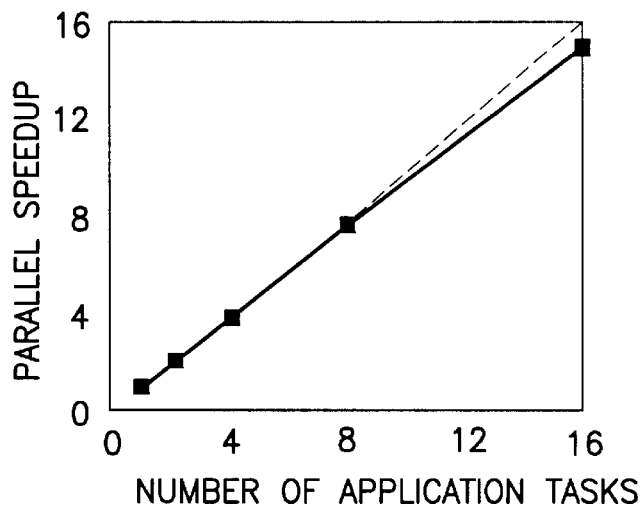
FIG. 11 graphically illustrates the parallel speedups for Retail2 with 64 neural nodes.

FIGS. 10 and 11 show similar analysis for the Retail2 problem. Network-partitioned results (not shown) for this problem show no speedup because the number of data fields is not large enough to amortize the interprocessor communication overhead. The amount of data in this problem shows some loss of parallel efficiency due to the MPl__ Allreduce operation shown in FIG. 4. The speedup curves for the 64-node problem look very similar for both methods because the load imbalance in the sparse BSOM method is smaller than in Retail1.

Figure 12:
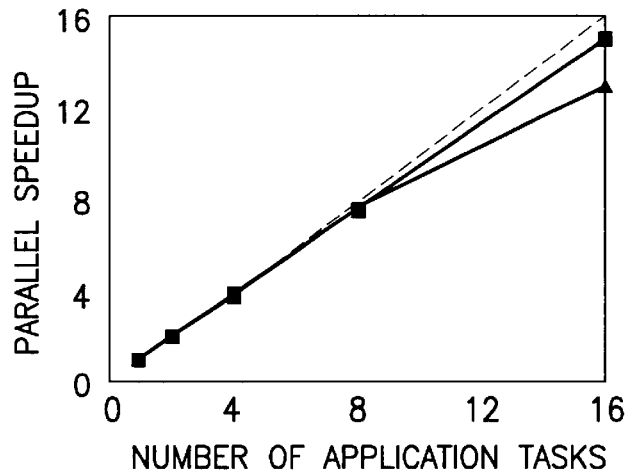
FIG. 12 graphically illustrates the parallel speedups for Census with 16 neural nodes.
Figure 13:
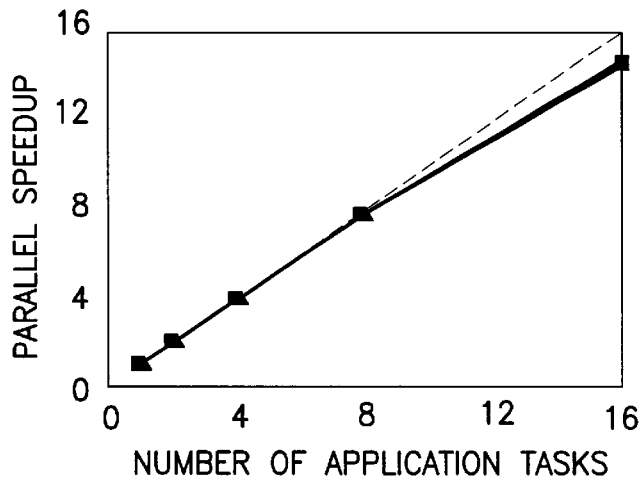
FIG. 13 graphically illustrates the parallel speedups for Census with 16 neural nodes.

The speedup curves for the Census problem are shown in FIGS. 12 and 13. The load imbalance is negligible here for the sparse BSOM method; the reduced scalability for the sparse BSOM method for 16 nodes is due to the fact that the sparse BSOM computer rate is approximately 4 times faster than the non-sparse-BSOM for this problem, and hence the interprocessor communication (MPI-Allreduce in FIG. 4) has a larger impact on the parallel speedup. Both methods show linear speedup for the larger 64-node problem.

6 Interpretation of SOM Results

Speeding up the SOM technique is only worthwhile if the resulting method produces useful, readily interpreted results. In this section, we present the interpretation of results obtained for the Census data set described in the preceeding section. Additional discussion of methods used to visualize and interpret the Retail2 data set can be found in [H. Rushmeier, R. Lawrence and G. Almasi, Case study: visualizing customer segmentations produced by self-organizing maps, submitted for publication].

Clustering or segmentation uses unsupervised training to identify groups of records which are mathematically similar in the input data space. One use of this information in a business context is the development of different (i.e. targeted) marketing strategies for each cluster or segment depending on the characteristics of the segment. A self-organizing feature map with K neural nodes immediately defines a useful segmentation: the records "closest" to node k [in the sense of Eq. (2)] form a single segment with a centroid (in the original n-dimensional input space) defined by the converged weight Vector $\overline{\omega}_k$. Furthermore, the self-organizing property of the SOM provides additional insight into the relationships between these clusters: records associated with neighboring nodes on the map will exhibit a greater similarity than records associated with non-neighboring nodes. This information can be used to combine records in adjacent nodes on the map to form larger "super-clusters" for additional marketing analysis.

Our SOM analysis of the "adult" (Census) database [University of California at Irvine, Machine learning databases, ftp://ftp.ics.uci.edu/pub/machine-learning-databases/] used a concatenation of the "training" and "test" data sets, omitting any records containing fields with unknown values. The resulting data set contained 45,216 records, which we analyzed using the data-partitioned batch SOM method with 64 neural nodes arranged on the square two-dimensional map. The classification field ("class") was not used as an input variable to the SOM analysis, but is used below in the characterization of the resulting segments. The interpretation of the general trends in the clustering is aided by visualizing the resulting distribution of the various attributes across the SOM grid.

Figure 14:
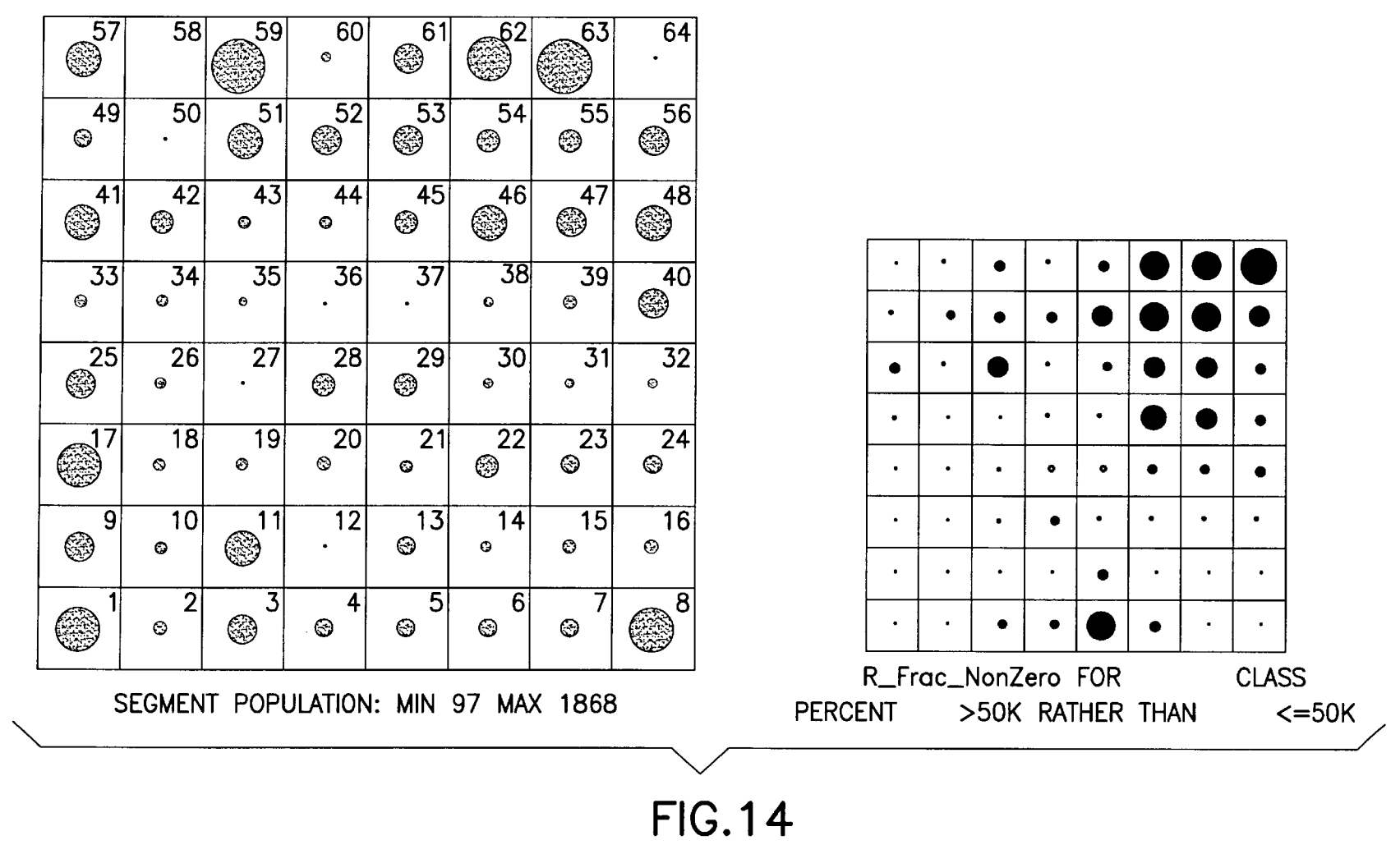

FIG. 14 shows the relative population of the various segments, along the out system of numbering the segments. The segment population ranges from a low of 97 records for segment 58, to a high of 1868 for segment 63. On the right, FIG. 14 shows the distribution of the class field, which is a binary representation of whether or not income is greater than $50,000. Although the class field was not use to train the SOM, we see that the records have been organized so that there is a clear pattern in the distribution of the class field. The marker for each segment is sized according to the ratio of the fraction of records with greater than $50,000 a year income in this segment to the fraction of records with greater than $50,000 in the whole population. For example, in segment 63, 1395 of 1868 records have income greater than $50,000, or about 75%. In the whole population, only about 215% of the records have income greater than $50, 000. by contrast only 14 of 1419 records, or about 1%, in segment 1 have income greater than $50,000. The distribution of income is relatively smoothly distributed on the SOM grid—with higher incomes near the upper right of the grid and in the center of the bottom of the grid.

The segmentation can be further interpreted by considering the distribution of other attributes. FIG. 15 shows the distribution of male and female on the grid, with the marker sized according to the fraction of the segment that is male relative to the fraction that is male in the overall population. Generally the bottom three rows of the grid are female, and the top of the grid is male. The concentration of higher incomes in the upper right of the grid then are male with high income, while the concentration in the center of the bottom of the grid are female with high income.

On the right, FIG. 15 shows the age distribution. Each marker is sized by the ratio of the average age in the segment to the average age of the population. The grid shows generally higher age to the right and lower to the left. Both females with high income (around segment 5) and males with high income (around segment 63) have are bout the average population age (about 40 years old). Neighboring segments 30 and 22, 31 and 23, and 32 and 24 have similar age distributions, while the triplets 30, 31, 32 and 22 and 23, and 24 have the same gender. Comparing the neighboring same age segments with different genders show that the male segments have consistently higher income (e.g. 30 has higher average income than 22 etc.)

Figure 16:
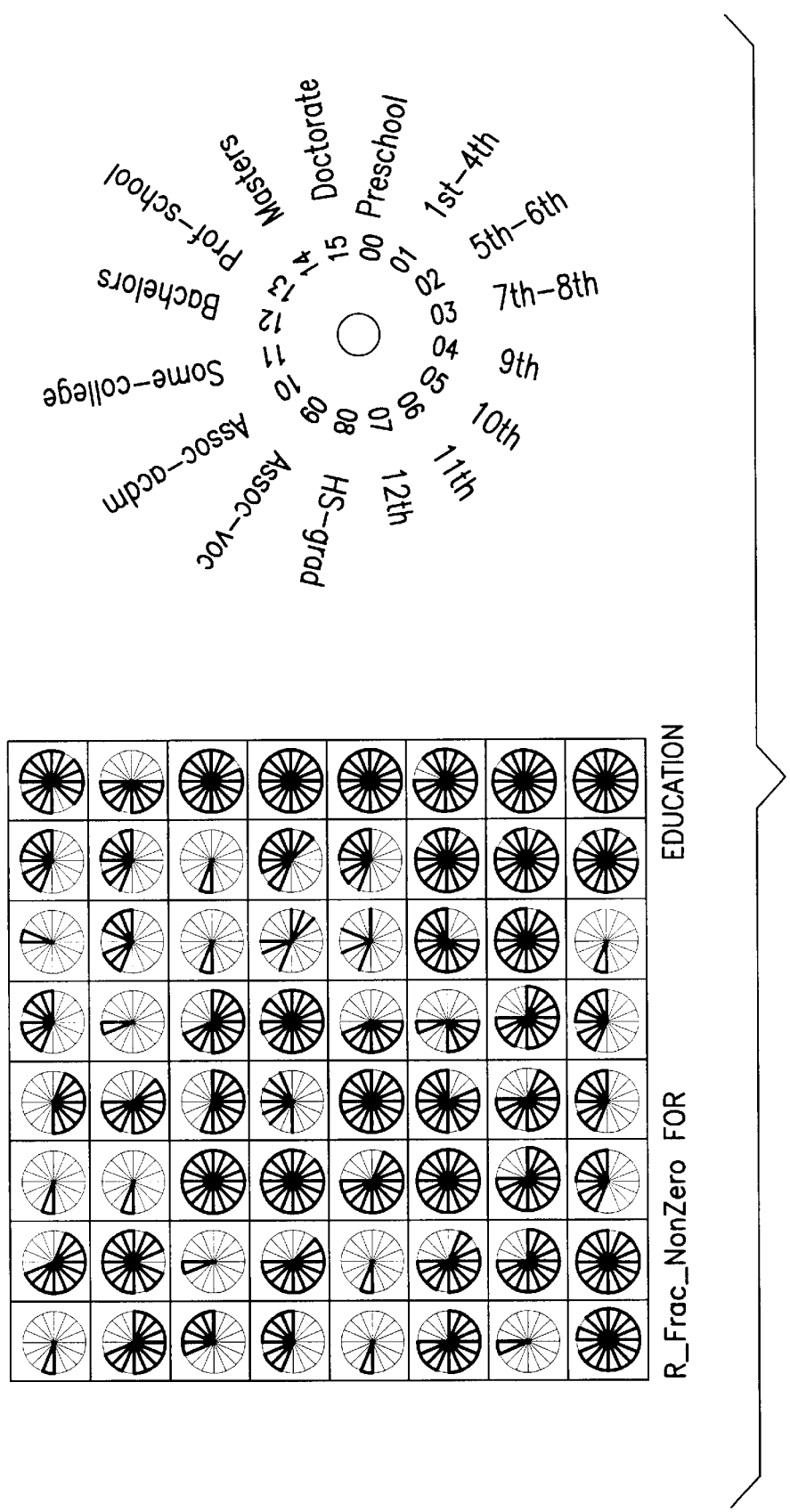
FIG. 16 graphically illustrates the distribution of data by level of education.

FIG. 16 shows the multivalued attribute for level of education as a pie chart. Each wedge in the pie represents a level of education, with high school and below in the lower semi-circle, and beyond high school in the upper semi-circle. Each wedge is shaded by the fractional representation of that attribute value has in the segment, relative to the fractional representation of that attribute value in the whole population. For example, in segment 57 all of the records list HS-grad (high school graduate) for education type, so that wedge is shown in black, and all of the other wedges are shown in white. By contrast segment 8 has as distribution of all the various education levels. While this display is more complex, trends are still evident. Segments 36, 37, 44, and 45 all have concentrations of education levels of high school and below, and these segments also correspond to low income levels. The segments with high income levels tend to have higher concentrations in the higher education levels. The distribution of education levels for females with high income (segment 5) and males with high income (segment 63) are nearly identical.

Figure 17:
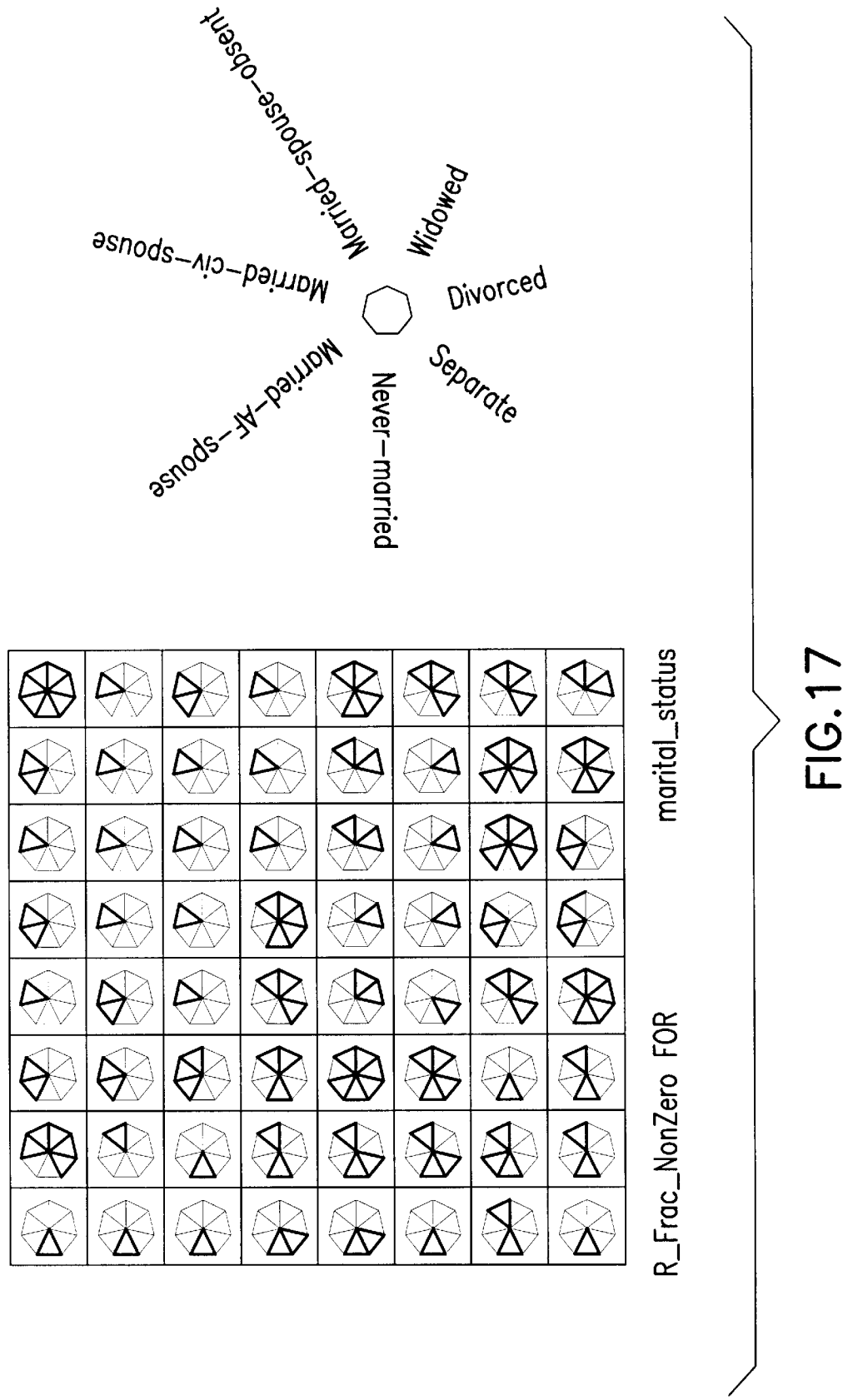
FIG. 17 illustrates the distribution of data by level of education.
Figure 19:
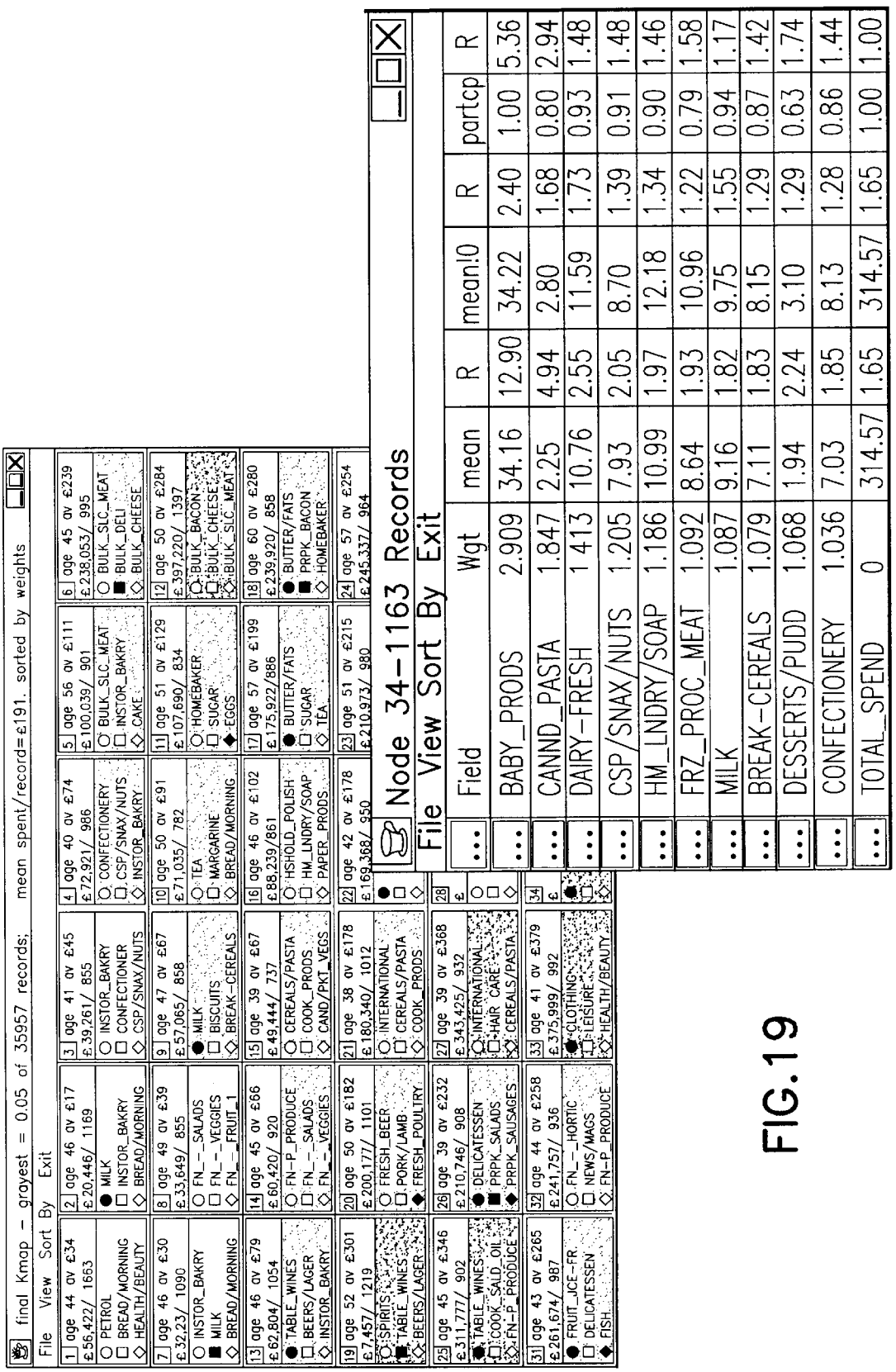
FIG. 19 illustrates the detailed statistics for a single cluster.
Figure 20A:
FIG. 20 illustrates the statistics for one input field across all clusters.

Finally, FIG. 17 shows the distribution of marital status across the grid. The pie representation for this multivalued attribute is the same as for education level. Generally, married with civilian spouse is represented on the right of the grid and never married is more highly represented on the left of the grid. The never married attribute is most highly concentrated in the areas with lower age and lower income.

In general then, the visualization of attributes across the SOM gives insight into the characteristics of each segment, and the distribution of attributes across the whole population. Clearly, combining demographic data such as that used in this segmentation with spending data from a commercial data ware house would give valuable insight into a company's customer database. Segments, or groups of neighboring segments, could be selected and marketing campaigns tailored for these segments according to their demographics and spending interests.

7 Summary and Conclusions

In this paper, we have developed a data-partitioned parallel method for the well-known self-organizing feature map developed by Kohonen. Our approach is based on an enhanced version of the batch SOM algorithm which is particularly efficient for sparse data sets encountered in retail data mining studies. We have demonstrated the computational efficiency and parallel scalability of this method for sparse and non-sparse data, using 3 data sets, two of which include actual retail spending data. Model problem analysis, plus visualizations of the segmentations produced for publicly available census data have shown that the batch SOM methodology provides reasonable clustering results and useful insights for data mining studies. Algorithms similar to those discussed in this paper are planned for inclusion in a future release of the IBM Intelligent Miner [*IBM Intelligent Miner*, http://www.software.ibm.com/data/intelli-mine] data mining product.

---

The attached notes describe the design for a software tool which we use to analyze the results of a clustering operation performed using the Self-Organizing Feature map (SOM) algorithm. The clustering operation identifies groups of records which are similar based on their input variables or fields. The object of the post-processing is to understand the characteristics of the clusters in order for the overall results to be useful to data mining and users. We need to understand how the records that are assigned to specific clusters differ from the average behavior of all the records in the original data set. WE do this for each cluster by identifying which input variables for the records in the cluster differ the most from the database average. This determination is made by sorting the fields according to various ratios as described below in the design notes.

The software tool draws a view (FIG. 1) of the SOM displaying the 3 fields which server to differentiate each cluster from the average over the database. Another view (FIG. 2) displays additional information (described in design notes) for the 10 most significant fields. Another view (FIG. 3) shows the SOM with information on a chosen input field which is used to determine how the field contributed in each of the clusters on the SOM.

Original design notes: ('segment', as used here, is same as 'cluster')

/...........................................................

SUMMARY OF KMAP DESIGN (3/12/98):

DEFINITIONS:

(1) Input data from Intelligent Miner results object:

records [segment] = number of records in segment
values[segment][field] = sum of values for fields over all records in segment
NZvalues[segment][field]= number of records in segment with non-zero values in field NZ implies non zero (2) Computed quantities from input data:

meanNZval[segment][field] values[segment][field]    records[segment]
meanNZval[segment][field] values[segment][field]    records[segment]
meanNZval[segment][field] NZvalues[segment][field]  records[segment]

NZ implies non_zero value
Partc implies participation (i.e., >0 value)

(3) Ratios background (R implies ratio)
Rrecords[segment]      =records[segment]       /records [BKGD]
Rvalue[segment][field] =value[segment][field]  /value[BKGD]
                                               [field]
RmeanX[segment][field] =meanX[segment][field]  /meanX[BKGD]
                                               [field]
                       (X can be 'Value' 'NZval' 'Partc')

(4) Note:
segment can be BKGD. In which case data is returned for entire dataset
field can be TOTALS. In which case data is returned as sum over fields

QUERIES (1) seq <row> <col>
    returns list of fieldnames, sorted by field according to
    One of the following sort_modes;

weight[segment][field]       --> SORT_MODE = 'weight'
    Rvalue[segment][field]       --> SORT_MODE = 'V'
    RmeanValue[segment][field]   --> SORT_MODE = 'meanV'
    RMeanNZval[segment][field]   --> SORT_MODE = 'meanN'
    RmeanPartc[segment][field]   --> SORT_MODE = 'meanP' row <0 or col <0 implies segment == BKGD (2) field <fieldname>
    returns Kohonen map showing one of the following quantities:

weight[segment][field]       --> MAP_MODE = 'weight'
    Rvalue[segment][field]       --> MAP_MODE = 'V'
    RmeanValue[segment][field]   --> MAP_MODE = 'meanV'
    RMeanNZval[segment][field]   --> MAP_MODE = 'meanN'
    RmeanPartc[segment][field]   --> MAP_MODE = 'meanP'
    Rrecords[segment]            --> MAP_MODE = 'records'

(3) sort <SORT_MODE>
    sets the SORT_MODE as defined above
(4) map <MAP_MODE>
    sets the MAP_MODE as defined above
(5) summary
    prints top 3 fields (according to SORT_MODE) in each segment
(6) show <fieldname> <row> <col>
    returns data for this field in this segment
(7) seqdist <r1> <c1> <r2> <c2>
    returns distance between two segments Format of .res file:

```
1??
nb_buckets min max            //total population
min max sum1 sum2             //total population
record splits                 //total population
min max sum1 sum2             //segment 0
record splits                 //segment 0
min max sum1 sum2             //segment 1
record splits                 //segment 1
.
.
record split is defined as (assuming nb_buckets 0–12)
totalFreq bin0 bin1 . . . Bin10 bin11 bin12 +  //freqs
totalFreq bin0 bin1 . . . Bin10 bin11 bin12 +  //sum1
totalFreq bin0 bin1 . . . Bin10 bin11 bin12 +  //sum2
```

TABLE 1

Description of the application data sets

|  | Retail1 | Retail2 | Census |
|---|---|---|---|
| Number of records | 99984 | 126282 | 45216 |
| Number of input data fields | 272 | 14 | 13 |
| Number of input data fields (after binary expansion) | 272 | 14 | 103 |
| Fraction of non-zero input data fields | 0.0287 | 0.4231 | 0.1239 |
| Size of input data file (MB) | 207.5 | 13.5 | 35.5 |

TABLE 2

Effective MCUP/s for the serial algorithms

|  | Neural nodes | Retail1 | Retail2 | Census |
|---|---|---|---|---|
| On-line SOM | 16 | 5.70 | 3.41 | 5.53 |
|  | 64 | 5.62 | 4.56 | 6.96 |
| Batch SOM (BSOM) | 16 | 5.92 | 4.15 | 6.82 |
|  | 64 | 5.72 | 5.31 | 6.17 |
| Sparse batch SOM | 16 | 83.14 | 6.67 | 34.46 |
|  | 64 | 49.35 | 7.08 | 22.10 |

Having thus described our invention, what we claim as new and desire to secure by Letters Patent is:

1. A method of organizing data in a parallel database which is partitioned across computational processors of a parallel computer, said data being organized into a plurality of records, said method comprising:

a. representing each record as an n dimensional vector;
b. compressing each n dimensional vector by eliminating zeros in components of each said n dimensional vector for each of said records; and
c. applying a modified self-organized map algorithm to operate on the non-zero components of each vector for said compressed input records to group said records into a plurality of clusters, wherein each cluster comprises a plurality of said records having a set of common input parameters.

2. A method as recited in claim 1, wherein said zeros are deleted each time each record is accessed.

3. The method of claim 1 wherein said applying of a modified self-organizing map algorithm comprises invoking the equation $$\bar{d}_k(t) = \sum_{x_i \neq 0} x_i(t)[x_i(t) - 2\omega_{ki}(t_0)] + \sum_{i=1}^{n} \omega_{ki}^2(t_0).$$

4. A method of retrieving data from a parallel database which is partitioned across computational nodes of a parallel computer said data being organized into a plurality of records, said method comprising:
   a. representing each record as an n dimensional vector;
   b. compressing each n dimensional vector by eliminating zeros in components of each said n-dimensional vector for each of said records;
   c. applying a modified self-organizing map algorithm to operate on the no-zero components of each vector for said compressed input records to group said records into a plurality of clusters, wherein each cluster comprises a plurality of said records having a set of common input parameters; and
   d. determining statistical measures of each record that is retrieved by using said input parameters associated with one of said clusters, said one cluster being the cluster from which said record was retrieved.

5. A method as recited in claim 4, wherein said statistical measures are determined by comparison of input parameters of corresponding clusters.

6. The method of claim 4 wherein said applying of a modified self-organizing map algorithm comprises invoking the equation $$\bar{d}_k(t) = \sum_{x_i \neq 0} x_i(t)[x_i(t) - 2\omega_{ki}(t_0)] + \sum_{i=1}^{n} \omega_{ki}^2(t_0).$$

7. A program storage device readable by a machine, tangibly embodying a program of instructions executable by said machine to perform method steps in a parallel transaction database which is partitioned across computational processors of a parallel computer said data being organized into a plurality of records, said method comprising the steps of:
   a. representing each record and n dimensional vector;
   b. compressing each n dimensional vector by eliminating zeros in components of each said n dimensional vector for each of said records; and
   c. applying a modified self-organized map algorithm to operate on the non-zero components of each vector for said compressed input records to group said records into a plurality of said nodes, wherein each group comprises a plurality of said records having a corresponding set of common input parameters.

8. The device of claim 7 wherein said step of applying a modified self-organizing map algorithm comprises invoking the equation $$\bar{d}_k(t) = \sum_{x_i \neq 0} x_i(t)[x_i(t) - 2\omega_{ki}(t_0)] + \sum_{i=1}^{n} \omega_{ki}^2(t_0).$$

* * * * *

UNITED STATES PATENT AND TRADEMARK OFFICE
CERTIFICATE OF CORRECTION

PATENT NO.     : 6,260,036 B1
DATED          : July 10, 2001
INVENTOR(S)    : Almasi et al.

It is certified that error appears in the above-identified patent and that said Letters Patent is hereby corrected as shown below:

<u>Title page,</u>
Item [73], Assignee to read, -- International Business Machines Corporation Armonk, New York --

Signed and Sealed this

Fifth Day of November, 2002

Attest:

JAMES E. ROGAN
Attesting Officer      Director of the United States Patent and Trademark Office